Patented Oct. 28, 1952

2,615,331

UNITED STATES PATENT OFFICE 2,615,331

APPARATUS FOR TESTING AERONAUTICAL EQUIPMENT

Edwin Lundgren, Frederick, Md., assignor to Foster Wheeler Corporation, New York, N. Y., a corporation of New York Application March 3, 1949, Serial No. 79,386

11 Claims. (Cl. 73—116)

This invention relates to aeronautical test equipment and more particularly to apparatus for testing aeronautical apparatus under simulated altitude conditions.

In testing aeronautical equipment under simulated altitude conditions, air is normally introduced at a desired temperature and at a desired pressure into a test cell containing the equipment to be tested to thereby simulate in the cell atmospheric conditions at a predetermined altitude. When aircraft engines, particularly of the jet propulsion type, are tested in a test cell, it is necessary to withdraw a large volume of the engine exhaust gases from the cell, which withdrawn gases are normally at a temperature of 1500° to 3500° F., and thereafter dispose of such gases. Normally exhaust gases are withdrawn from a testing cell by means of a plurality of exhausters or compressors which are usually driven by electric motors.

The present invention provides apparatus for exhausting gases from a test cell in which aircraft motors of the jet propulsion type are tested, which gases are withdrawn in the desired volume and at the desired temperature and pressure by the use of steam jet ejectors operated by steam generated through use of the heat contained in gases exhausted from the testing cell.

An object of the invention is to utilize the waste heat of exhaust gases from aircraft engines of the jet propulsion type installed for testing in a test cell to thereby produce steam under pressure for utilization in steam ejectors for the purpose of exhausting gases from the test cell.

Another object of the present invention is to cool, wash and purify exhaust gases from test cells.

A further object of the present invention is to provide means for controlling the volume of gases exhausted from test cells and the delivery pressure of the exhausted gases from exhausters or compressors operated by steam jet ejectors.

Another object of the present invention is to utilize the heat recovery apparatus used for recovering heat from exhaust gases to heat gases that fall below a predetermined temperature.

A further object of this invention is to provide a simplified, economical and less time-consuming method of establishing desired altitude conditions in test cells for testing aeronautical equipment.

Figure 1:
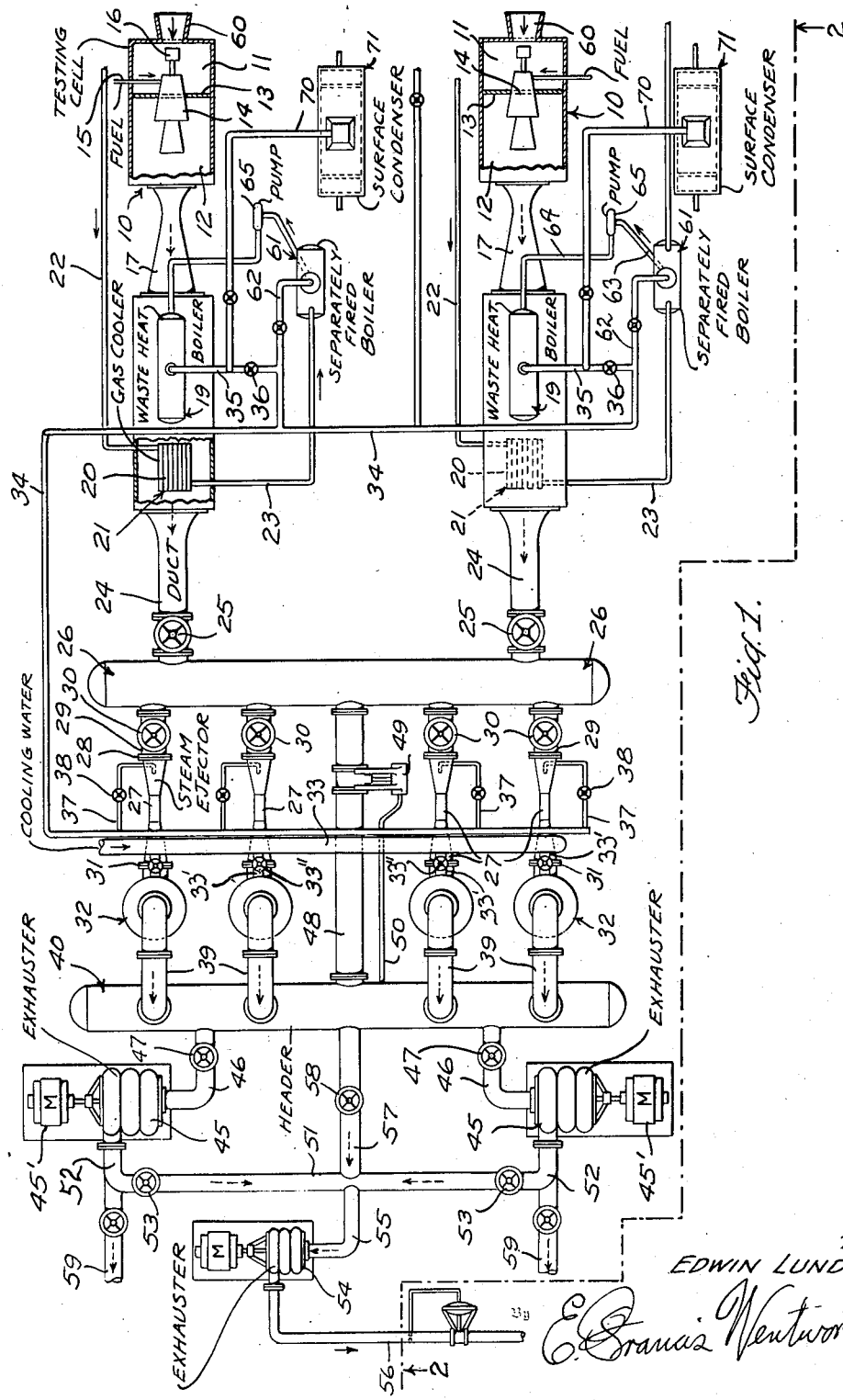
Figure 2:
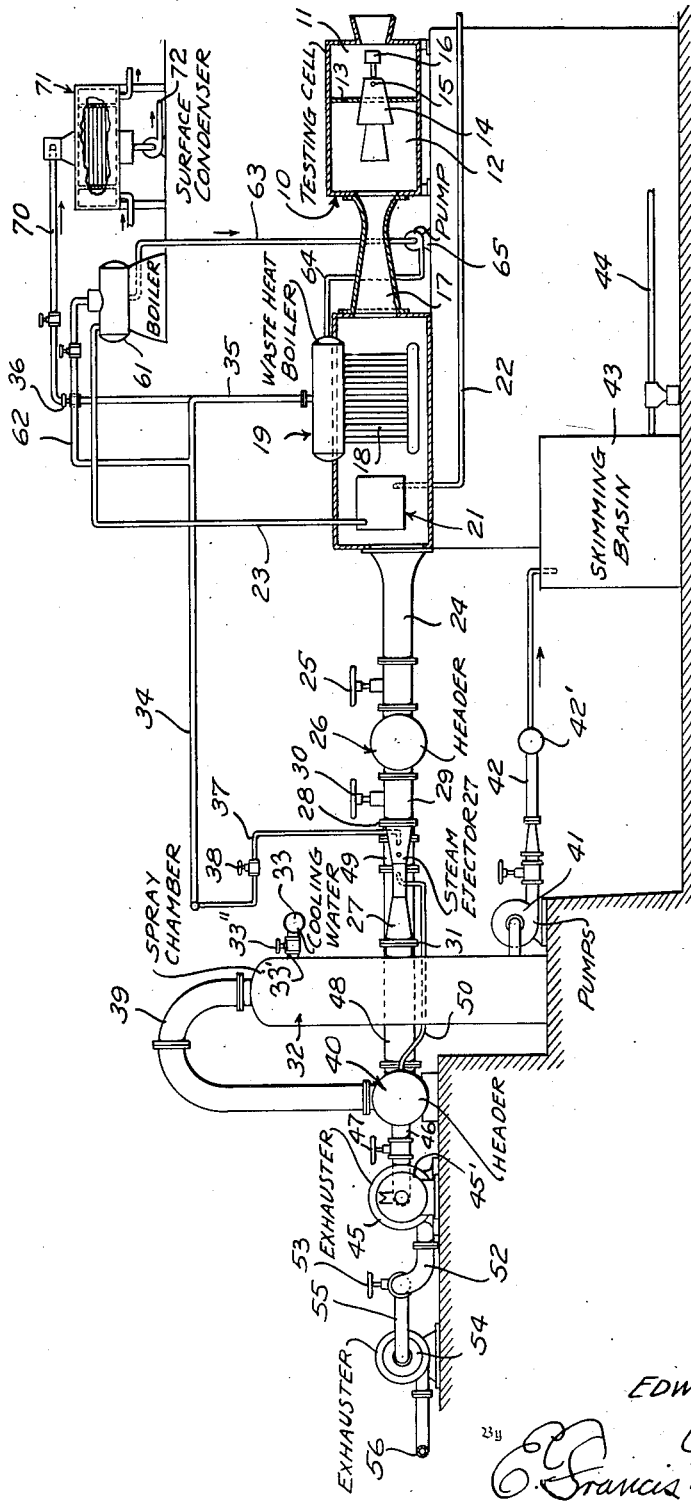

The particular features and advantages which characterize the invention will be understood from the following description when considered in connection with the accompanying drawings forming a part thereof and in which:

Fig. 1 is a plan view diagrammatically illustrating the apparatus of the present invention, and Fig. 2 is a diagrammatic side elevational view taken on the line 2—2 of Fig. 1.

Like characters of reference refer to the same or similar parts throughout the views.

Referring to the drawings, altitude testing cells, two of which are illustrated, are designated by the reference numeral 10. The cells are divided into compartments 11 and 12 by a diaphragm 13, and a propulsion jet engine 14 is mounted within each cell so as to receive air from chamber 11 and discharge exhaust gases into chamber 12. Jet engines 14 receive fuel through fuel lines 15 while a torque or thrust measuring and recording device 16, as shown, is connected to each engine 14.

Exhaust gases from engines 14, which gases are normally at a temperature of 1500° to 3500° F., are discharged into chambers 12 and pass through an expanding throat 17 associated with each cell 10 and into indirect heat exchange relationship with steam generating surface 18 of waste heat boilers 19 in communication respectively with each expanding throat. After flowing in heat exchange relationship with steam generating surface 18, the gases are further cooled by passing in indirect heat exchange relationship with the tubes 20 of a gas cooler 21, the tubes 20 receiving cool water through conduit 22 and discharging heated water through conduit 23.

Gases, which flow in heat exchange relationship with vapor generating surface 18 of waste heat boiler 19 and cooler 21, are cooled to approximately 100° F. After passing from cooler 21, the gases flow into a duct 24 controlled by a valve 25 and thence into a distributing header 26. The gases are distributed throughout header 26, the gases from one cell 10 entering header 26 adjacent one end thereof, while the gases from the other cell 10 enter header 26 adjacent the other end thereof.

A plurality of steam jet ejectors 27 communicate with header 26, each ejector being in communication at the inlet end 28 thereof with one end of a duct 29 which duct is controlled by a valve 30. The ducts 29 communicate at the opposite end thereof with header 26 at points in spaced relationship with one another longitudinally of the header. The discharge 31 of each of the steam jet ejectors communicate with a spray condenser 32 each comprising a spray chamber having a spray device, not shown, in the upper part thereof. The spray device of each condenser receives cooling water through a pipe 33' controlled by a valve 33" and connected to a main conduit 33. Steam jet ejectors 27 receive steam through a steam line 34 which is in communication with waste heat boilers 19 through branch lines 35 controlled by a valve 36 and with the steam ejectors through branch lines 37 controlled by valves 38. Condensible steam and vapors in the exhaust gases are condensed in chambers 32 and uncondensible gases are washed and further cooled therein. The washed and cooled gases discharge from the spray chambers through discharge conduits 39 at the top of the chambers into header 40, while the condensed steam vapor and cooling water from the chambers 32 are pumped by pumps 41 through valve controlled conduits 42 into a header 42' thence to a skimming basin 43. In the basin 43, tar, carbon or hydrocarbon discharged by the jet propulsion engines 14 into the exhaust gases are skimmed from the water and condensate from spray chambers 32 so that the water may be reused, which water is withdrawn from basin 43 through discharge line 44.

Centrifugal type exhausters 45, two of which are illustrated, have their suctions 46 connected to header 40, the suctions being controlled by valves 47. Exhausters 45 are driven mechanically through electric motors or prime movers 45' and normally are operated so as to have an intake pressure substantially equal to the delivery pressure of the gases from ejectors 37. However, header 40 is in communication directly with header 26 through by-pass conduit 48 and exhausters 45 may, therefor, be operated at substantially the same pressure as the intake pressure of header 26, as will hereinafter be fully described. By-pass conduit 48 is controlled by an automatically controlled valve 49 which valve is responsive to the pressure in header 40 through pipe 50 so that the maximum pressure in header 40 may be controlled when ejectors 27 are in operation. When ejectors 27 are not in operation and valves 30 are closed, the automatic control valve 49 is reset for a different control pressure in header 40 or is locked with the valve in full open position.

Exhausters 45 discharge into a header 51 through discharge connections 52 controlled by valves 53. The header 51 is, as shown, in communication with another exhauster 54, which is similar to exhausters 45, the suction of said exhauster 54 communicating with header 51 through line 55. Exhauster 54, as shown, discharges through discharge pipe 56 to the atmosphere. A by-pass 57 controlled by valve 58 communicates at the opposite ends thereof with headers 51 and 40 respectively. Exhausters 45 and 54 may act on header 40 as a single exhausting unit by closing valves 53 and opening valves 47 and valves 58 so that gases are discharged from header 40 by exhausters 45 to the atmosphere through discharge pipes 59, while gases from header 40 are also discharged through by-pass 57, pipe 55, exhauster 54 and line 56.

When jet engines 14 are to be tested under low temperatures, refrigerated air enters chamber 11 through inlets 60 which, during starting-up periods, causes cold air to flow through expanding throats 17 over steam generating surface 18 of waste heat boilers 19. In order that the liquid in the steam generating surfaces 18 will not freeze, separately fired steam generators 61 are used, the steam from which flows through valve controlled steam lines 62 into the waste heat boilers through branch lines 35 controlled by valves 36 thereby causing the steam generating surfaces of the waste heat boilers to become heated.

Feed water for boilers 61 enters said boilers through conduit 23, while feed water for waste heat boilers 19 is passed from boilers 61 to the waste heat boiler lines 63 and 64 by pumps 65.

In operation, when a jet motor is to be tested under high altitude conditions which requires the use of refrigerated air, such air flows through inlet 60' into chamber 11, thence through the motor into chamber 12 of cell 10 thereafter to pass through expanding throat 17 and thereafter over steam generating surface 18 of waste heat boiler 19. During such period, boiler 61 is fired so that steam passes through line 62 into line 35 and enters waste heat boiler 19, heating the waste heat boiler sufficiently to prevent freezing of the liquid therein. Steam from boiler 61 is also passed to steam jet ejectors 27 through lines 62, 35, 34 and branch line 37 to operate the ejectors during the starting-up period of the jet engines. When the jet engine is in full operation and the gases are heated to their normal temperature, boiler 61 is no longer operated and the valve in line 62 is closed. Steam is then generated in the waste heat boiler by the passage of the hot exhaust gases in heat exchange relationship with the steam generating surface 18, the gases thereby becoming cooled. Steam from waste heat boiler 19 is conducted to steam jets 27 through lines 35, 34 and branch lines 37 which causes the steam ejectors to operate. Under normal conditions, valves 25 in ducts 24 are open as are valves 30 in conduits 29 so that the suction created by operation of steam ejectors 27 withdraws gases from chamber 12 through expanding throat 17, waste heat boiler 19, gas cooler 21, duct 24, thence through header 26 into the spray condensers 32. In the spray condensers 32, condensible steam or vapors in the gases is condensed and is passed to skimming basin 43, as hereinbefore described, while uncondensible gases are washed in the spray in said chambers and withdrawn after washing through conduits 39 into header 40 by action of exhausters 45, the suction of which are connected to header 40.

If the conditions under which the tests are being made in test cells 10 do not require the use of ejectors 27, valves 30 in pipes 39 are closed, by-pass valve 49 opened and gas withdrawn from header 26 through the action of exhausters 45 on header 40. This causes the gases from header 26 to flow through by-pass 48, thence through suction conduit 46 to the atmosphere through discharge conduits 49 or to suction 55 of exhausters 54 through header 51, thereafter to be discharged to the atmosphere through pipe 56.

During tests requiring the simulation of low altitude conditions, the steam jet ejectors are usually not in operation, the valves 30 being closed and the by-pass valve 49 in by-pass 48 being opened so that gases flow from the cells to header 26, as hereinbefore described, thence through by-pass 48 into header 40 by action of the exhausters 45 and 54 on header 40.

The exhaust gases flowing in heat exchange relationship with the waste heat boiler when the ejectors are not in use, would cause steam to be generated which steam would not be utilized. In order that the boiler water used to generate such steam would not be wasted, valve 36 is closed and steam from the waste heat boiler is passed through steam line 70 into a condenser 71, wherein the steam is condensed and the condensate removed through line 72 for further use.

With the present invention, heat from the gases created in a test cell is used to provide means through which said gases and air used to simulate atmospheric conditions in a cell are exhausted from the cell thereby providing a simplified, economical and expeditious method and apparatus of establishing desired altitude conditions in test cells for testing aeronautical equipment.

It will be understood that changes may be made in the form, location and relative arrangement of the several parts of the apparatus disclosed and in the sequence of the steps of the method disclosed without departing from the principles of the invention. Accordingly, the invention is not to be limited by the scope of the appended claims.

What is claimed is:

1. In apparatus for simulation of altitude conditions in the testing of jet propulsion aircraft engines, testing cell forming means, a partition dividing said testing cell into an inlet chamber and an outlet chamber, the testing cell being adapted to receive said jet engine so that it receives air from the inlet chamber and discharges exhaust gases into the outlet chamber, the inlet chamber and the outlet chamber of the testing cell being in communication with one another through said engine, refrigerated air conduit means communicating with the testing cell inlet chamber, a steam generator having a gas inlet and a gas outlet, the gas inlet being in communication with said gas outlet of the testing cell, the steam generator having steam generating surface in heat exchange relationship with gases flowing from the gas inlet to the gas outlet of the steam generator, a steam ejector with a suction inlet and a discharge outlet, the suction inlet being in communication with the steam generator outlet, steam conduit means communicating with the steam generator so as to receive steam therefrom and with the steam ejector so as to deliver steam thereto, a separately fired auxiliary steam generator in communication with the steam ejector and with the steam generating surface of the first-mentioned steam generator so as to deliver steam thereto, gas scrubbing means having a gas inlet and a gas outlet, the scrubbing means inlet being in communication with the discharge of said ejector, and conduit means in communication with the scrubber gas outlet and through which scrubbed gases pass from the scrubber means.

2. In apparatus for simulation of altitude conditions in the testing of jet propulsion aircraft engines, testing cell forming means, a partition dividing said testing cell into an inlet chamber and an outlet chamber, the testing cell being adapted to receive said jet engine so that it receives air from the inlet chamber and discharges exhaust gases into the outlet chamber, the inlet chamber and the outlet chamber of the testing cell being in communication with one another through said engine, refrigerated air conduit means communicating with the testing cell inlet chamber, a steam generator having a gas inlet and a gas outlet, the gas inlet being in communication with said gas outlet of the testing cell, the steam generator having steam generating surface in heat exchange relationship with gases flowing from the gas inlet to the gas outlet of the steam generator, a steam ejector with a suction inlet and a discharge outlet, the suction inlet being in communication with the steam generator outlet, steam conduit means communicating with the steam generator so as to receive steam therefrom and with the steam ejector so as to deliver steam thereto, a separately fired auxiliary steam generator in communication with the steam ejector and with the steam generating surface of the first-mentioned steam generator so as to deliver steam thereto, a condenser having a gas inlet and a gas outlet, spray means in said condenser, condensing medium conduit means in communication with the spray means, the gas inlet, the gas outlet and the spray means being so arranged that gas passes in direct heat exchange relationship with spray in the condenser, the inlet of the condenser being in communication with the discharge of said ejector, means in communication with the condenser gas outlet for withdrawing uncondensible gases from the condenser, and other means through which condensate is withdrawn from said condenser.

3. In apparatus for simulation of altitude conditions in the testing of jet propulsion aircraft engines, testing cell forming means, a partition dividing said testing cell into an inlet chamber and an outlet chamber, the testing cell being adapted to contain said jet engine so that it receives air from the inlet chamber and discharges exhaust gases into the outlet chamber, the inlet chamber and the outlet chamber of the testing cell being in communication with one another through said engine, air conduit means communicating with the testing cell inlet chamber through which air at the desired atmospheric condition enters said cell, a steam generator having a gas inlet and a gas outlet, the gas inlet being in communication with said gas outlet chamber, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, the suction inlets being in communication with said header at spaced points longitudinally of the header, steam-conducting means communicating with the steam-generating surface of said steam generator so as to receive steam therefrom and with the steam jet ejectors so as to deliver steam thereto, a plurality of gas scrubbers each having a gas inlet and a gas outlet, the gas inlet of each of the scrubbers being in communication with a discharge outlet of one of the steam jet ejectors, another elongated header, the gas outlets of said scrubbers being in communication with the other header at spaced points longitudinally of said other header, and exhauster means in communication with said other header to exhaust gases therefrom.

4. In apparatus for simulation of altitude conditions in the testing of jet propulsion aircraft engines, testing cell forming means, a partition dividing said testing cell into an inlet chamber and an outlet chamber, the testing cell being adapted to contain said jet engine so that it receives air from the inlet chamber and discharges exhaust gases into the outlet chamber, the inlet chamber and the outlet chamber of the testing cell being in communication with one another through said engine, air conduit means communicating with the testing cell inlet chamber through which air at the desired atmospheric condition enters said cell, a steam generator having a gas inlet and a gas outlet, the gas inlet being in communication with said gas outlet chamber, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, a valve controlled connection between the suction inlet of each ejector and the header, said connection being in communication with said header at spaced points longitudinally of the header, means for conducting steam from the steam generator to said ejectors, a plurality of gas scrubbers each having a gas inlet and a gas outlet, the gas inlet of each of the scrubbers being in communication with a discharge outlet of one of the steam jet ejectors, another elongated header, the gas outlets of said scrubbers being in communication with the other header at spaced points longitudinally of said other header, a by-pass conduit communicating with said header and said other header and through which gases from the header are by-passed around said ejectors and scrubbers, a valve in said by-pass to control the flow of gases therethrough, and exhauster means in communication with said other header to exhaust gases therefrom.

5. In apparatus for simulation of altitude conditions in the testing of jet propulsion aircraft engines, testing cell forming means, a partition dividing said testing cell into an inlet chamber and an outlet chamber, the testing cell being adapted to contain said jet engine so that it receives air from the inlet chamber and discharges exhaust gases into the outlet chamber, the inlet chamber and the outlet chamber of the testing cell being in communication with one another through said engine, air conduit means communicating with the testing cell inlet chamber through which air at the desired atmospheric condition enters said cell, a steam generator having a gas inlet and a gas outlet, the gas inlet being in communication with said gas outlet chamber, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, the suction inlets being in communication with said header at spaced points longitudinally of the header, steam-conducting means communicating with the steam-generating surface of said steam generator so as to receive steam therefrom and with the steam jet ejectors so as to deliver steam thereto, a plurality of condensers each having a gas inlet and a gas outlet, spray means in each of the condensers, the gas inlet, the gas outlet and the spray means being so arranged that gas passes in direct heat exchange relationship with spray in the condenser, the inlet of each condenser being in communication with the discharge of one of said ejectors, another elongated header, a discharge connection between the condenser gas outlet of each condenser and said other header, the last-mentioned connections being in communication with said other header at a plurality of spaced points longitudinally of the header, and exhauster means in communication with said other header to exhaust gases therefrom.

6. In apparatus for simulation of altitude conditions in the testing of jet propulsion aircraft engines, testing cell forming means, a partition dividing said testing cell into an inlet chamber and an outlet chamber, the testing cell being adapted to receive said jet engine so that it receives air from the inlet chamber and discharges exhaust gases into the outlet chamber, the inlet chamber and the outlet chamber of the testing cell being in communication with one another through said engine, refrigerated air conduit means communicating with the testing cell inlet chamber, a steam generator having a gas inlet and a gas outlet, the gas inlet being in communication with said gas outlet chamber, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, the suction inlets being in communication with said header at spaced points longitudinally of the header, means for conducting steam from the steam generator to said ejectors, a separately fired auxiliary steam generator in communication with the steam ejectors and with the steam generating surface of the first-mentioned steam generator so as to deliver steam thereto, a plurality of gas scrubbers each having a gas inlet and a gas outlet, the gas inlet of each of the scrubbers being in communication with a discharge outlet of one of the steam jet ejectors, another elongated header, the gas outlets of said scrubbers being in communication with the other header at spaced points longitudinally of said other header, and exhauster means in communication with said other header to exhaust gases therefrom.

7. In apparatus for simulation of altitude conditions in the testing of jet propulsion aircraft engines, testing cell forming means, a partition dividing said testing cell into an inlet chamber and an outlet chamber, the testing cell being adapted to receive said jet engine so that it receives air from the inlet chamber and discharges exhaust gases into the outlet chamber, the inlet chamber and the outlet chamber of the testing cell being in communication with one another through said engine, refrigerated air conduit means communicating with the testing cell inlet chamber, a steam generator having a gas inlet and a gas outlet, the gas inlet being in communication with said gas outlet chamber, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, a valve controlled connection between the suction inlet of each ejector and the header, said connections being in communication with said header at spaced points longitudinally of the header, means for conducting steam from the steam generator to said ejectors, a separately fired auxiliary steam generator in communication with the steam ejectors and with the steam generating surface of the first-mentioned steam generator so as to deliver steam thereto, a plurality of condensers each having a gas inlet and a gas outlet, spray means in each of the condensers, the gas inlet, the gas outlet and the spray means being so arranged that gas passes in direct heat exchange relationship with spray in the condenser, the inlet of each condenser being in communication with the discharge of one of said ejectors, another elongated header, a discharge connection between the condenser gas outlet of each condenser and said other header, the last-mentioned connections being in communication with said other header at a plurality of spaced points longitudinally of the header, a by-pass conduit communicating with said header and said other header and through which gases from the header are by-passed around said ejectors and scrubbers, a valve in said by-pass to control the flow of gases therethrough, and exhauster means in communication with said other header to exhaust gases therefrom.

8. In apparatus for testing under atmospheric conditions engines which discharge heated exhaust gases, said apparatus comprising a testing cell adapted to receive atmosphere and contain the engine so that it is subject to the atmospheric condition in the cell, said cell having a gas outlet through which exhaust gases are discharged therefrom, a steam generator having a gas inlet and a gas outlet, the gas inlet being in communication with said gas outlet of the testing cell, the steam generator having steam generating surface in heat exchange relationship with gases flowing from the gas inlet to the gas outlet of the steam generator, a steam ejector with a suction inlet and a discharge outlet, the suction inlet being in communication with the steam generator outlet, steam conduit means communicating with the steam generator so as to receive steam therefrom and with the steam ejector so as to deliver steam thereto, a separately fired auxiliary steam generator in communication with the steam ejector and with the steam generating surface of the first-mentioned steam generator so as to deliver steam thereto, gas scrubbing means having a gas inlet and a gas outlet, the scrubbing means inlet being in communication with the discharge of said ejector, and conduit means in communication with the scrubber gas outlet and through which scrubbed gases pass from the scrubber means.

9. In apparatus for testing under atmospheric conditions engines which discharge heated exhaust gases, said apparatus comprising a testing cell adapted to receive atmosphere and contain the engine so that it is subject to the atmospheric condition in the cell, said cell having a gas outlet through which exhaust gases are discharged therefrom, a steam generator having a gas inlet and a gas outlet, the gas inlet being in communication with said gas outlet of the cell, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, the suction inlets being in communication with said header at spaced points longitudinally of the header, steam-conducting means communicating with the steam-generating surface of said steam generator so as to receive steam therefrom and with the steam jet ejectors so as to deliver steam thereto, a plurality of gas scrubbers each having a gas inlet and a gas outlet, the gas inlet of each of the scrubbers being in communication with a discharge outlet of one of the steam jet ejectors, another elongated header, the gas outlets of said scrubbers being in communication with the other header at spaced points longitudinally of said other header, and exhauster means in communication with said other header to exhaust gases therefrom.

10. In apparatus for testing under atmospheric conditions engines which discharge heated exhaust gases, said apparatus comprising a testing cell adapted to receive atmosphere and contain the engine so that it is subject to the atmospheric condition in the cell, said cell having a gas outlet through which exhaust gases are discharged therefrom, a steam generator having a gas inlet and a gas outlet, the gas inlet being in communication with said gas outlet of the cell, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, a valve controlled connection between the suction inlet of each ejector and the header, said connection being in communication with said header at spaced points longitudinally of the header, means for conducting steam from the steam generator to said ejectors, a plurality of gas scrubbers each having a gas inlet and a gas outlet, the gas inlet of each of the scrubbers being in communication with a discharge outlet of one of the steam jet ejectors, another elongated header, the gas outlets of said scrubbers being in communication with the other header at spaced points longitudinally of said other header, a by-pass conduit communicating with said header and said other header and through which gases from the header are by-passed around said ejectors and scrubbers, a valve in said by-pass to control the flow of gases therethrough, and exhauster means in communication with said other header to exhaust gases therefrom.

11. In apparatus for testing under atmospheric conditions engines which discharge heated exhaust gases, said apparatus comprising a testing cell adapted to receive atmosphere and contain the engine so that it is subject to the atmospheric condition in the cell, said cell having a gas outlet through which exhaust gases are discharged therefrom, a steam generator having a gas inlet and a gas outlet, the gas inlet being in communication with said gas outlet of the cell, said steam generator having steam generating surface in heat exchange relationship with gases flowing from the gas inlet to the gas outlet of the steam generator, an elongated header, a gas discharge conduit communicating with the steam generator gas outlet and the header, a plurality of steam jet ejectors each having a suction inlet and a discharge outlet, a valve controlled connection between the suction inlet of each ejector and the header, said connections being in communication with said header at spaced points longitudinally of the header, means for conducting steam from the steam generator to said ejectors, a separately fired auxiliary steam generator in communication with the steam ejectors and with the steam generating surface of the first-mentioned steam generator so as to deliver steam thereto, a plurality of condensers each having a gas inlet and a gas outlet, spray means in each of the condensers, the gas inlet, the gas outlet and the spray means being so arranged that gas passes in direct exchange relationship with spray in the condenser, the inlet of each condenser being in communication with the discharge of one of said ejectors, another elongated header, a discharge connection between the condenser gas outlet of each condenser and said other header, the last-mentioned connections being in communication with said other header at a plurality of spaced points longitudinally of the header, a by-pass conduit communicating with said header and said other header and through which gases from the header are by-passed around said ejectors and scrubbers, a valve in said by-pass to control the flow of gases therethrough, and exhauster means in communication with said other header to exhaust gases therefrom.

EDWIN LUNDGREN.

REFERENCES CITED

The following references are of record in the file of this patent:

UNITED STATES PATENTS

| Number | Name | Date |
|---|---|---|
| 1,589,391 | Herr | June 22, 1926 |
| 1,632,896 | Herr | June 21, 1927 |
| 1,991,717 | Wondra | Feb. 19, 1935 |

FOREIGN PATENTS

| Number | Country | Date |
|---|---|---|
| 494,482 | Great Britain | Oct. 26, 1938 |